United States Patent
Su

(10) Patent No.: US 6,857,223 B2
(45) Date of Patent: Feb. 22, 2005

(54) HERMETICALLY SEALED BAITS FOR SUBTERRANEAN TERMITES

(75) Inventor: Nan-Yao Su, Davie, FL (US)

(73) Assignee: University of Florida Research Foundation, Inc., Gainesville, FL (US)

(*) Notice: Subject to any disclaimer, the term of this patent is extended or adjusted under 35 U.S.C. 154(b) by 0 days.

(21) Appl. No.: 10/392,730

(22) Filed: Mar. 19, 2003

(65) Prior Publication Data

US 2003/0177689 A1 Sep. 25, 2003

Related U.S. Application Data

(60) Provisional application No. 60/366,832, filed on Mar. 22, 2002.

(51) Int. Cl.[7] .............................................. A01M 1/20
(52) U.S. Cl. ........................................................ 43/131
(58) Field of Search ............................................ 43/131

(56) References Cited

U.S. PATENT DOCUMENTS

| | | | | |
|---|---|---|---|---|
| 3,858,346 A | * | 1/1975 | Bailey | 43/124 |
| 4,043,073 A | * | 8/1977 | Basile | 43/124 |
| 4,143,479 A | * | 3/1979 | Kingston | 43/44.99 |
| 4,460,606 A | * | 7/1984 | Bettarini et al. | 514/720 |
| 4,793,474 A | * | 12/1988 | Drake | 206/0.5 |
| 5,329,726 A | | 7/1994 | Thorne et al. | |
| 5,695,776 A | * | 12/1997 | Ballard et al. | 424/408 |
| 5,756,114 A | * | 5/1998 | Peterson | 424/405 |
| 5,778,596 A | | 7/1998 | Henderson et al. | |
| 5,815,090 A | | 9/1998 | Su | |

(List continued on next page.)

FOREIGN PATENT DOCUMENTS

| | | |
|---|---|---|
| DE | 36 05 042 A | 8/1987 |
| DE | 100 24 736 A | 11/2001 |
| GB | 1160128 | * 7/1969 ............... 43/131 |
| JP | 63-151033 | 12/1989 |
| WO | WO 93/23998 | 12/1993 |

OTHER PUBLICATIONS

Su, Nan–Yao, et al., "Effect of Behavior on the Evaluation of Insecticides for Prevention of or Remedial . . . ," Journal of Economic Entomology (1982), pp. 188–193, vol. 75, iss. 2.

Su, Nan–Yao, "Field Evaluation of a Hexaflumuron Bait for Population Suppression of Subterranean . . . ," Journal of Economic Entomology (1994), pp. 390–397, vol. 87, iss. 2.

Su, Nan–Yao, et al., "Remedial Baiting with Hexaflumuron in Above–Ground Stations to Control . . . ," Journal of Economic Entomology (1997), pp. 809–817, vol. 90, iss. 3.

*Primary Examiner*—Teri P. Luu
*Assistant Examiner*—Bret Hayes
(74) *Attorney, Agent, or Firm*—Saliwanchik, Lloyd & Saliwanchik

(57) ABSTRACT

This invention describes a cellulose bait that is hermetically sealed with a non-biodegradable material through which termites can tunnel or chew. The envelopes of the subject invention are preferably made of a soft/flexible material. Because the bait is hermetically sealed ("HS baits") in a weather-resistant enclosure, it can remain in the environment for extended periods until termite feeding occurs. Not only is the bait protected, the environment is also protected from the toxicant because the toxicant is completely sequestered until it is encountered by the foraging termites. This novel bait system does not require monitoring. Such baits can be placed in large quantities in places where monitoring is not practical and/or economical. The subject bait packs can be distributed in large quantities in agricultural fields or in large areas such as an entire city for area-wide population management of subterranean termites. The subject invention also provides surprising advantages associated with bypassing bait inspection and replacement; the subject invention eliminates "station avoidance" by some termite species. In other preferred embodiments, HS baits of the subject invention can be used in conjunction with durable, sturdy station housings.

27 Claims, 4 Drawing Sheets

U.S. PATENT DOCUMENTS

| | | |
|---|---|---|
| 5,937,571 A | 8/1999 | Megargle et al. |
| 5,950,356 A | 9/1999 | Nimocks |
| 6,052,066 A | 4/2000 | Su |
| 6,058,646 A | 5/2000 | Bishoff et al. |
| 6,100,805 A | 8/2000 | Lake |
| 6,202,341 B1 | 3/2001 | Bernard |
| 6,235,301 B1 | 5/2001 | Ballard et al. |
| 6,343,434 B1 * | 2/2002 | Petti .......................... 43/131 |
| 6,360,477 B1 * | 3/2002 | Flashinski et al. ............ 43/131 |
| 6,370,812 B1 | 4/2002 | Burns et al. |
| 6,397,516 B1 | 6/2002 | Su |
| 2002/0023382 A1 | 2/2002 | Hope et al. |

* cited by examiner

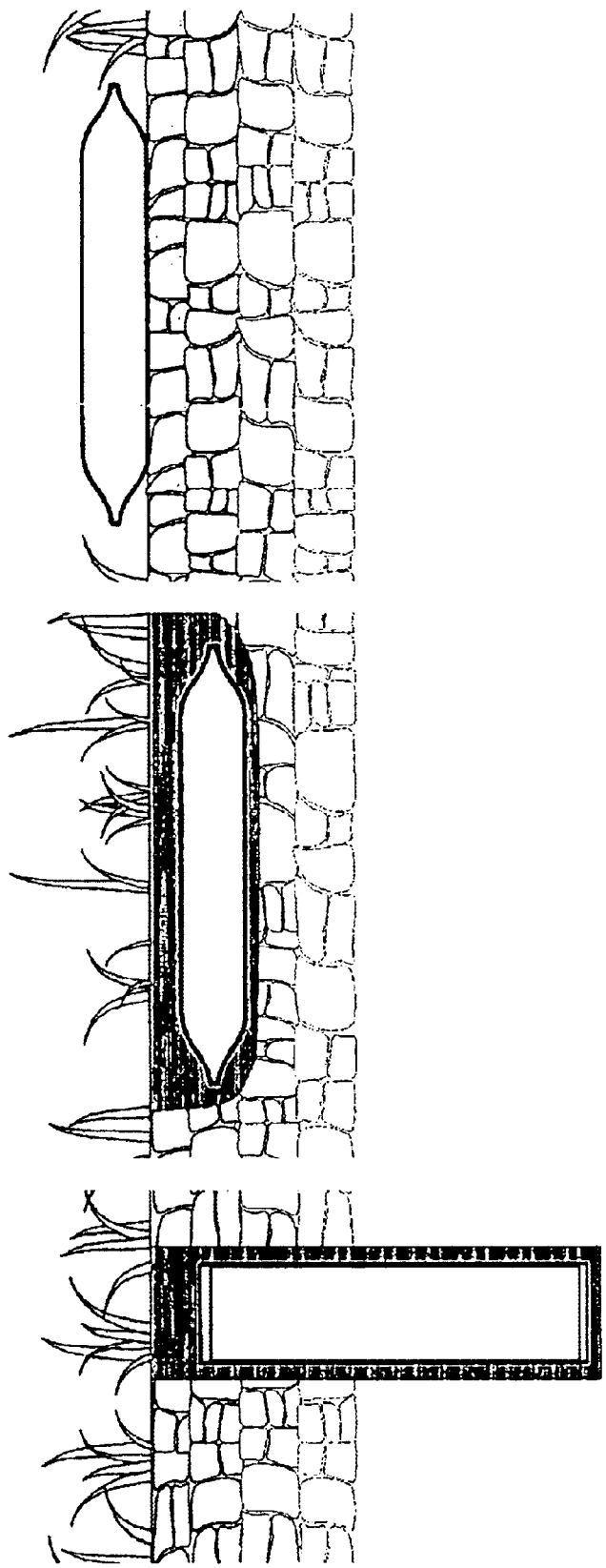

HERMETICALLY SEALED BAITS FOR SUBTERRANEAN TERMITES

CROSS-REFERENCE TO RELATED APPLICATION

This application claims the benefit of U.S. Provisional Application No. 60/366,832, filed Mar. 22, 2002.

BACKGROUND OF THE INVENTION

The introduction of the first commercial termite bait system, SENTRICON®, in 1995 drastically changed the landscape of subterranean termite control practices. Traditional soil insecticide applications in the last half-century typically use 100–200 gallons (or 5–10 kg active ingredient) of pesticide to kill soil-borne subterranean termites in the immediate vicinity of the treated house. Because a subterranean termite colony may contain a gallery system that extends up to 300 feet from an infested house, soil treatments (despite the quantity of insecticide applied) seldom impact the entire colony. A monitoring-baiting program such as SENTRICON®, on the other hand, is capable of eliminating the entire colony. See WO 93/23998.

This type of system relies on periodic, routine monitoring. Stations containing monitoring devices are first placed in the soil to detect termites. When termites are found in a station, the monitoring device is replaced with baits containing a small amount of insecticide such as hexaflumuron. Termites are allowed to continue feeding on baits, which distributes the active ingredient throughout the colony population until the entire colony is eliminated. Because of the target-specific approach, only a few grams of hexaflumuron are needed to eliminate a colony that may contain several hundred thousand termites (Su 1994, *J. Econ. Entomol.* 87:389–397).

Due to its low environmental impact, hexaflumuron was the first compound to be registered under EPA's Reduced Risk Pesticide Initiative. The SENTRICON® system was the recipient of EPA's Presidential Green Chemistry Award in 2000.

Various other subterranean termite baiting systems, both proposed and commercial products, also employ the monitoring-baiting approach. U.S. Pat. No. 5,329,726 (Thorne et al.), for example, adopted a "diagnostic" phase before bait placement. Japanese Patent No. 63-151033 (System Maintenance, Inc.) describes a system in which a wooden housing containing another wooden detector was first placed in soil to attract termites, and the detector was replaced with an insecticide material when termites were found in the wooden housing. U.S. Pat. No. 5,950,356 (Nimocks & David) describes an apparatus comprising a housing, with an opening, that contains nontoxic baits to detect termites. Toxic baits are placed into the housing without removing the nontoxic baits when termites are detected in the housing. U.S. Pat. No. 5,937,571 (FMC Corp.) describes a tamper resistant bait station containing cellulose baits. The station has a plurality of apertures to allow termite access to a cellulose bait impregnated with a slow-acting toxicant. U.S. Pat. No. 4,043,073 relates to a rigid container that encloses bait material for termites or other pests, wherein the bait has an odiferous material in it to signal to humans when the container has been attacked by pests. U.S. Pat. No. 6,100,805 relates to a spike-shaped tube for termite detection. A conductive loop is present between two wooden blocks inside the tube.

Cellulose-based baits (for monitoring and/or toxicant delivery) degrade rapidly in the environment, as they are placed in soil and exposed to outdoor elements (rainfall, temperature fluctuation, high humidity, and biotic factors such as fungal decay and other insects). This necessitates frequent onsite inspection and replacement of these cellulose baits. These systems are intended for both remedial and preventative control, and rely on a routine monitoring program (primarily to detect termites so that toxic baits can be applied). The manual, onsite inspection currently required to maintain these systems is also the most labor-intensive and costly element of the systems. Moreover, the onsite monitoring procedure becomes virtually impractical when the system has to be used to protect, for example, an entire city or large agricultural areas. Protecting the entire city of New Orleans and/or Ellis Island would be examples. Subterranean termites are known to damage sugarcane, rubber trees, and oil palm trees, for example; thousands of stations are needed for effective control of termite populations in an agriculture plantation. Stations placed in the plantation tend to get lost in the vastness of the land, and inspection of such a large number of stations is not practical or cost-effective.

Another category of termite baiting methods is intended for remedial control, i.e., to be used after termites are found. As with many in-ground systems typically used in monitoring-baiting programs, baits for remedial control are applied only when termites are present. The prior art generally used either a rigid outer housing with openings to allow termite access to a toxicant, and/or an exposed, cellulose/wood block (with a toxicant). An above-ground station made of a re-closable plastic bag containing bait matrix was described by Su et al. (1997, *J. Econ. Entomol.* 90:809–817). This station has an opening to allow for termite access to the baits. This system was placed directly over active infestations of subterranean termites in a house or tree to allow for immediate bait consumption by termites. U.S. Pat. No. 5,778,596 (Henderson & Chen) describes an elaborate double-chamber baiting system that is placed in the vicinity of termite populations so that termites can be placed in the first chamber (containing non-toxic food) and thus preconditioned before entering the second chamber (that contains bait/toxic food). U.S. Pat. No. 6,058,646 (Bishoff et al.) relates to an above-ground system that employs a plurality of interchangeable station housings that contain termite baits. The housings have orifices that allow termites to have immediate access to the baits, and multiple stations can be stacked on top of each other while maintaining continuous termite access to the baits. These systems require a periodical inspection for bait replacement. Thus, with manual operation like the in-ground systems, costly onsite visits by technicians are unavoidable.

Typical bait housings currently in use provide openings for termite access to baits. No provisions are made to effectively protect the cellulose-based baits from the environmental elements such as rainfall, high humidity, temperature fluctuation, and other biotic factors (such as fungal decay often associated with wooden and other cellulose-containing bait materials). WO 93/23998 describes a bait casing, but that is primarily to facilitate easy handling of the bait.

Even with baiting-monitoring systems that use an easily removable bait to minimize disruption to foraging tunnels, another continuing problem is "station avoidance" by particularly "shy" termite species such as *Reticulitermes virginicus* in North America, or *R. speratus* in Asia. These species are known to be highly sensitive to disturbance and have a tendency to stay away from feeding sites that are disturbed in any way. For these species, the monitoring-baiting procedure can be less effective because once the stations are opened and baits are placed, termites often do not return (at least for an extended period) to the stations to consume the baits.

BRIEF SUMMARY OF THE INVENTION

The invention provides a cellulose bait that is hermetically sealed with a non-biodegradable material through which termites can tunnel or chew. Because the bait is hermetically sealed ("HS bait") in a weather-resistant enclosure, it can remain in the environment for extended periods until termite feeding occurs. Not only is the bait protected, the environment is also protected from the toxicant because the toxicant is completely sequestered until it is encountered by foraging termites.

Termite-control baits of the subject invention, which are long-lasting in the environment, were not heretofore known in the art and were not commercially available. One advantage that the subject invention can provide is a great reduction in the labor associated with deploying termite baits. The bait packs of the invention can be deployed and will remain in good condition until they are encountered by termites. Periodic re-application is thus avoided.

In addition, this novel bait system does not require monitoring. Such baits can be placed in large quantities in places where monitoring is not practical and/or economical. The subject bait packs can be distributed in a large quantity in agricultural fields or in a large area such as an entire city for area-wide population management of subterranean termites. In some embodiments, electronic monitoring can be used; however, this is not required. Embodiments of the subject invention can also be used by homeowners (on an individual basis), with a single-step application, without the laborious routine monitoring currently performed by pest-control professionals.

The subject invention also provides surprising advantages associated with bypassing bait inspection and replacement; the subject invention eliminates "station avoidance" by some termite species. Thus, the subject invention also relates broadly to the control of particularly "shy" termites, such as Reticulitermes speratus and Reticulitermes virginicus. Using the particularly and surprisingly advantageous devices and methods of the subject invention, previously uncontrollable termites can now be controlled.

Envelopes of the subject invention can be deployed with or without a rigid station housing.

In one embodiment, an HS bait of the subject invention is enclosed in a durable, sturdy station housing, wherein the housing has termite-access holes, and the housing protects the HS bait, which can be made of a soft/flexible material, from physical breakage. Such arrangements, with an HS bait insert that remains intact for extended periods of time in the environment, were not heretofore known or suggested.

It was surprising to find that a completely sealed bait, wherein the sealing material is durable in the environment, could still provide excellent termite control. Using this approach was counter-intuitive, as the art heretofore favored a rigid outer housing with openings to allow termite access to the bait.

While the subject invention might initially appear to be a simple solution to a very difficult problem, this should be a testament to the ingenious nature of this invention. The surprising and unexpected success of this apparently simple solution is also concretely demonstrated in the Examples presented below, which show success where other systems failed. There is quite apparently a long-felt need for such solutions, as more costly and complex commercial approaches are currently being used for termite control. The subject invention offers various improvements.

BRIEF DESCRIPTION OF THE DRAWINGS

FIG. 1 shows various examples of hermetically sealed (HS) baits.

FIG. 2 shows that HS bait can be installed, for example, vertically in soil (FIG. 2A), in a shallow trench near soil surface (FIG. 2B), or placed on soil surface (FIG. 2C).

DETAILED DESCRIPTION OF THE INVENTION

Figure 1A:
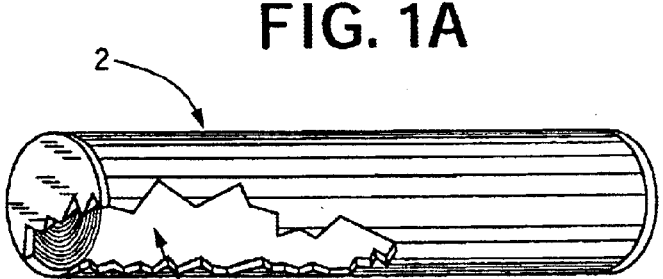
FIG. 1A: A cylindrical cellulose-based bait (1) hermetically wrapped and sealed from all sides with closed-cell polyethylene sheet (2).

The subject invention provides a hermetically sealed (HS) bait, which comprises termite bait that is completely sealed with a weather-resistant ("durable") material (also referred to herein as the "envelope" or "enclosure") that is also soft enough to be penetrated by termite activity such as feeding, chewing, tunneling, or excavation. By "hermetically sealed," it should be understood that the weather-resistant material used for enclosing the bait provides protection of the bait against environmental factors (such as rainfall, high humidity, temperature fluctuation, and other biotic factors such as fungal decay) for extended periods of time (for example, six months to one to three or so years or more). This term also means that the contained bait is relatively permanently sealed. That is, a recloseable baggie is not "hermetically sealed," because a baggie "seal" is not permanent and it is not strong enough or tight enough to seal an inner bait so as to protect it from moisture, decay, and the like for extended periods of time in the environment.

Thus, the subject invention includes a hermetically sealed bait container comprising a bait matrix within a weather-resistant, termite-edible enclosure that hermetically seals said bait matrix within said enclosure so that said bait is not exposed to environmental moisture when said bait container is deployed in the environment, wherein said bait matrix comprises a termite toxicant and a cellulose material, and wherein said enclosure is made of a material that is preferred by termites. The material of the enclosure (or envelope)

should also not be readily broken by the activity of other soil dwelling organisms such earthworms, ants, beetle larvae, and other wood destroying insects such as carpenter ants, powderpost beetles, bark beetles, wood boarders and the like. Thus, the material can be said to be "preferred by termites."

In contrast to prior art bait housings that are made of a sturdy/rigid material, envelopes of the subject invention can preferably be made of a soft/flexible material. Materials suitable for use as the envelopes/enclosures are eaten by termites/are termite edible. Such materials can include closed-cell polyethylene, expanded polystyrene (Styrofoam®), expanded polypropylene, textured polyethylene (ArtForm®), vinyl, polyol resin of polymeric diisocyanate (Insta-Foam®), absorbent paper with polyethylene backing, cellular rubber, sponge rubber, and the like. Many types of polymer-based materials, with or without cellulose, can be used for this purpose. Other examples include padding sheets, foam blocks, packaging materials, insulation, and laboratory bench top protection sheets. These materials possess the desired characteristics that are resistant to environmental factors such as rainfall, high humidity, temperature fluctuation, and other biotic factors such as fungal decay. However, the soft, foam-like textures of these materials are uniquely preferred by termites for tunneling and excavation. Field experiments consistently showed that other (non-termite) soil dwelling organisms or wood destroying insects did not tunnel or excavate these materials.

The envelopes can be deployed without a rigid station housing. However, when placed near the soil surface, a rigid cover or a durable housing with termite-access holes may be used to protect the HS bait from being disturbed by human activities. A semi-circular piece of PVC tubing is one example of a cover that can be used. The cover can also be used to mark the location of the HS bait. A cover is not required but might be helpful when the baits are deployed around buildings and like structures.

In one embodiment, cellulose-based, tubular-shaped bait is hermetically sealed from all sides with a closed-cell polyethylene sheet (FIG. 1A). The HS bait can be placed in soil (FIG. 2A) at any depth to simulate a piece of wood in soil for subterranean termites.

Figure 1B:
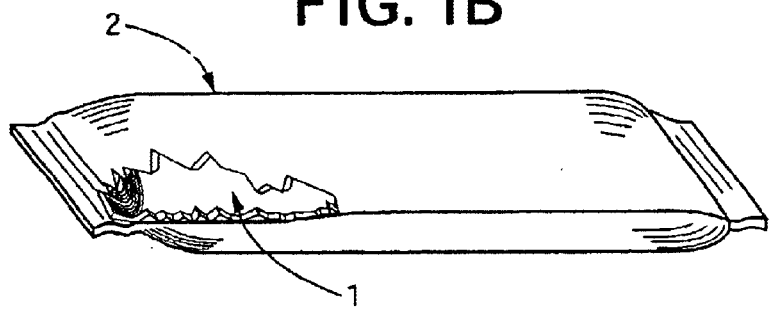
FIG. 1B: A HS bait with compressed cross section.

Another embodiment is an HS bait with an oval or compressed cross section (FIG. 1B); this can be placed on (FIG. 2C) or near the soil surface in a shallow trench (FIG. 2B). The compressed shape makes it easier to bury in a shallow trench, and prevents the HS bait from rolling when placed on the soil surface. These configurations simulate fallen wooden branches, logs, or other cellulose materials such as sugarcane cuttings near or on the soil surface, which are foraged by subterranean termites in nature. For example, HS baits are to be buried in the soil (FIG. 2A or 2B) for *Coptotermes* or *Reticulitermes* species because they forage underground. For some *Heterotermes* species, HS baits are to be placed on the surface of the soil (FIG. 2C) because these species tend to search for cellulose materials on the soil surface. All types of isopterans and subterranean termites can be targeted with the subject invention, including subterranean termites of the genus *Reticulitermes, Coptotermes, Heterotermes, Odontotermes, Microcerotermes, Amitermes, Mactrotermes*, and *Nasutitermes*.

Figure 1C:
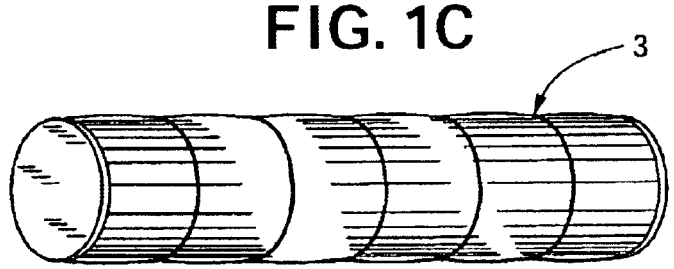
FIG. 1C: HS bait with plastic or wire wrapping (3) so that the indentations caused by the wrappings provide desirable texture for termites to initiate tunneling.
Figure 1D:
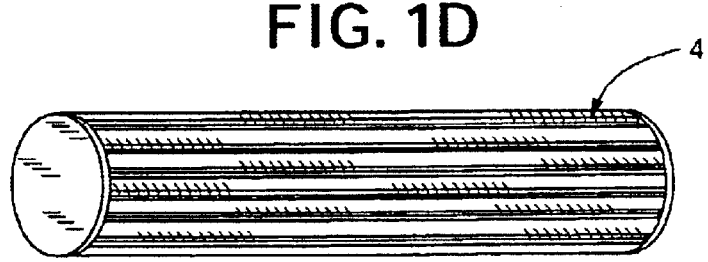
FIG. 1D: HS bait with groove texture (4) to encourage termite chewing.
Figure 1E:
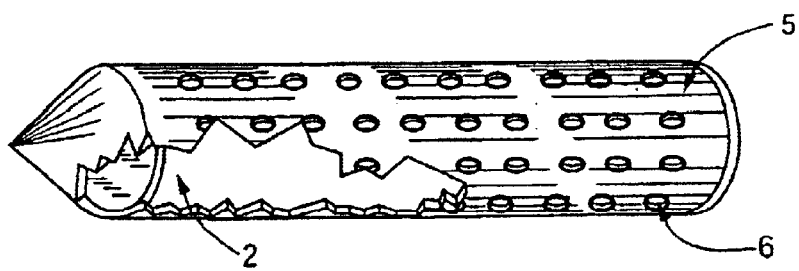
FIG. 1E: HS bait such as FIG. 1A enclosed in a durable and sturdy station (5) with termite-access holes (6) for protection from physical breakage. One end of the station housing may be of a conical shape for vertical insertion in soil.

In some preferred embodiments, plastic or wire may be wrapped over the HS bait so that the indentations caused by the wrappings provide desirable texture for termites to initiate tunneling (FIG. 1C). Another alternative is to create grooves or similar textures on the surface of an HS bait to encourage termite chewing (FIG. 1D). To prevent physical breakage, HS baits may be enclosed in durable and sturdy housings with termite access holes (FIG. 1E).

The termite bait is preferably impregnated with slow-acting and non-repellent toxicants, preferably as defined by Su et al. (1982, *J. Econ. Entomol.* 75:188–193) for population control of subterranean termites. Examples of such toxicants are hexaflumuron, noviflumuron, sulfluramid, diflubenzuron, or dihaloalkyl arylsulfone.

In some preferred embodiments, electronic monitoring can be used. See, e.g., U.S. Pat. Nos. 5,815,090; 6,052,066; embodiments shown in U.S. Pat. No. 6,100,805; and U.S. Ser. No. 09/260,961 (Nan-Yao Su, "Dimensionally Stable Sensor for Monitoring Termite Activity"). The applicant is unaware of prior examples of electronic monitoring of a flexible bait pack as described herein (without a sturdy/rigid housing). In fact, materials previously used for electronic monitoring could be easily damaged without some type of a rigid/sturdy support. A breakage or cracking of the sensor (by bending of the bait casing, for example) would result in a false positive indication of termite activity. In any case, monitoring (electronic or otherwise) is surprisingly and advantageously not required. Thus, the subject provides a flexible bait pack in which no rigid components are required.

However, if desired, certain embodiments of the subject invention can make use of durable, sturdy (rigid) station housings. For example, in one type of preferred embodiment, the subject application is enclosed in a durable, sturdy station housing, wherein the station housing has termite access holes. Thus, HS baits of the subject invention (see, e.g., FIG. 1E) can be adapted for insertion into station housings such as those of WO 93/23998 and U.S. Pat. Nos. 6,397,516 and 6,370,812. Preferably, the HS bait for use in such embodiments is removable without substantially disrupting termite foraging tunnels leading to the station. Embodiments where the HS bait is adapted to removably (removable without significantly disturbing foraging termites) fit inside of a station housing are much longer-lasting than previous bait tubes. Electronic monitoring components can optionally be used in these embodiments.

In other embodiments, the rigid housing itself can be hermetically sealed within an outer envelope of the subject invention. Such embodiments (with or without electronic monitoring) are convenient for packaging, shipping, handling, setup, and deployment. It is also possible for the outer envelope of the subject invention to enclose less than all of the station housing. For example, the top of the station housing can be left unwrapped to allow for periodic inspection, if desired. Such embodiments would still seal and protect the bait portions (from exposure to the soil, for example). Any of these embodiments can remain in an undisturbed state for long periods of time in the exposed environment. Thus, the subject invention includes a durable station housing, wherein a bait component is within the station housing, and wherein the station is wholly or partially sealed within an outer casing of the subject invention. The outer casing is preferably closely fitted to the station housing (i.e., the outer casing has a shape that matches that of all or part of the inner, rigid housing). This is the type of fit that can be accomplished by procedures similar to shrink wrapping. However, the outer casing/sealing materials of the subject invention are distinguishable from packing/shipping materials, the latter of which are not designed to be eaten by termites and are not suited for sealing/protecting the bait/housing for extended periods of environmental exposure. Such packaging materials are thus not "durable." Also in contrast to packaging materials, materials for use according to the subject invention are "preferred by termites"/termite edible.

The outer casing/seal of the subject invention can also be impregnated with a semiochemical in accordance with U.S. provisional application Ser. No. 60/366,830 (filed Mar. 22, 2002; Nan-Yao Su, entitled "A Semiochemical Reservoir to Attract Subterranean Termites Tunneling in Soil"). The HS bait of the subject invention can also be used in conjunction with the small polymer chips of U.S. Ser. No. 60/366,830. When attached to or placed in soil adjacent to an HS bait, semiochemicals from the chips permeate into the adjacent soil. This creates a lasting semiochemical gradient to attract termites toward the vicinity of the HS bait. Such chips can also be attached to or otherwise associated with the subject baits. However, the envelopes and the sealed bait materials of the subject invention can be free of semiochemicals and/or odorous materials that are detectable by humans.

The subject bait packs can be distributed in a large quantity in agricultural fields and in large areas such as entire cities for area-wide population management of subterranean termites. The enclosure can also be made of polymer materials that are designed to decompose at a desired time range.

In some preferred embodiments, electronic monitoring of the bait pack(s) can be used, but it is not required. Monitors that are separate from the subject bait packs can also be used in systems of the subject invention. Such monitors could range from simple wooden stakes to more elaborate electronic monitoring stations. Electronic (or otherwise) monitoring is more suited for, but is not limited to, the protection of individual structures (or a group of structures or an area) by professionals. The subject invention, on the other hand, provides a termite control system that works effectively where other systems are not possible or economically practical. This is discussed in more detail below in the Examples section.

Thus, the subject invention includes a system or method of termite control (reducing or eliminating a population of termites) comprising deploying a great number of HS baits to protect an entire city, a large agricultural area, and other large areas. These systems can also be used to protect entire (small to large) islands. Such uses were not practical (or possible) with prior systems, especially systems that rely on monitoring. Thus, the subject invention includes a system wherein, for example, approximately 10, 20, 30, 40, 50, 60, 70, 80, 90, 100, 200, 300, 400, 500, 600, 700, 800, 900, 1,000, 1,500, 2,000, 2,500, 3,000, 5,000 or more (and various combinations thereof) HS baits are deployed in systematic locations (a grid, for example) to protect an entire area such as a city. Such systems were not previously known.

The subject baits may also be used by homeowners, with a single-step application, without the laborious routine monitoring currently performed by pest-control professionals.

The subject invention also provides surprising advantages associated with bypassing bait inspection and replacement; the subject invention eliminates "station avoidance" by some termite species. Prior control methods were not effective against these "shy" termites. This, and the surprising ability of the subject invention to control "shy" termites is concretely demonstrated below in the Examples section. Thus, the subject invention also relates broadly to the control of particularly "shy" termites, including certain members of the genus *Reticulitermes*, such as *Reticulitermes flavipes speratus* and *Reticulitermes flavipes virginicus*. Most members of the genus *Heterotermes* are also particularly shy. Members of the genus *Odontotermes* are possibly the most shy of all. The particularly and surprisingly advantageous devices and methods of the subject invention can be optimized for particular applications.

All patents, patent applications, provisional applications, and publications referred to or cited herein are incorporated by reference in their entirety to the extent they are not inconsistent with the explicit teachings of this specification.

Following are examples that illustrate procedures for practicing the invention. These examples should not be construed as limiting. All percentages are by weight and all solvent mixture proportions are by volume unless otherwise noted.

EXAMPLE 1

Durability Test

Figure 3:
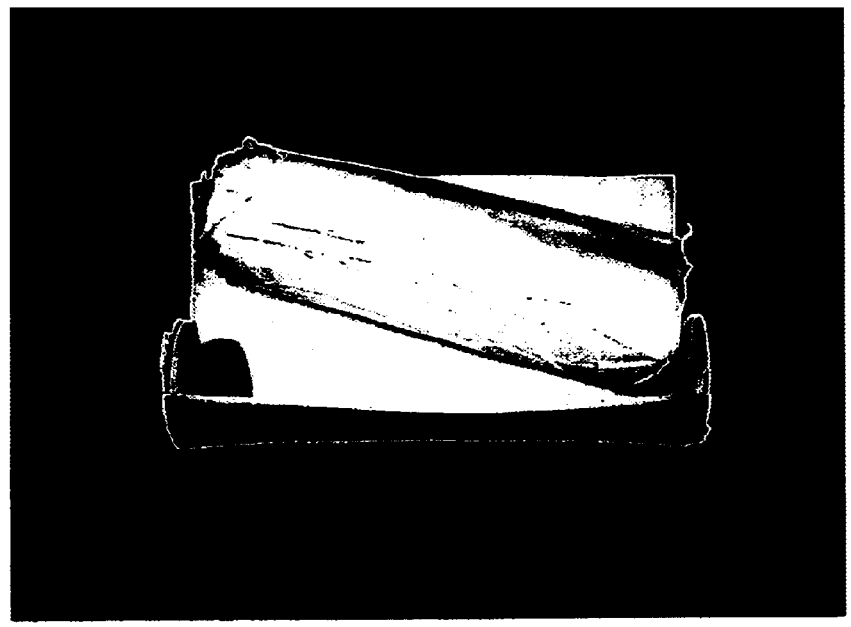
FIG. 3 shows a cellulose bait inside an HS bait tube; the bait remained dry and intact 1 year after placement in soil under field conditions.
Figure 4:
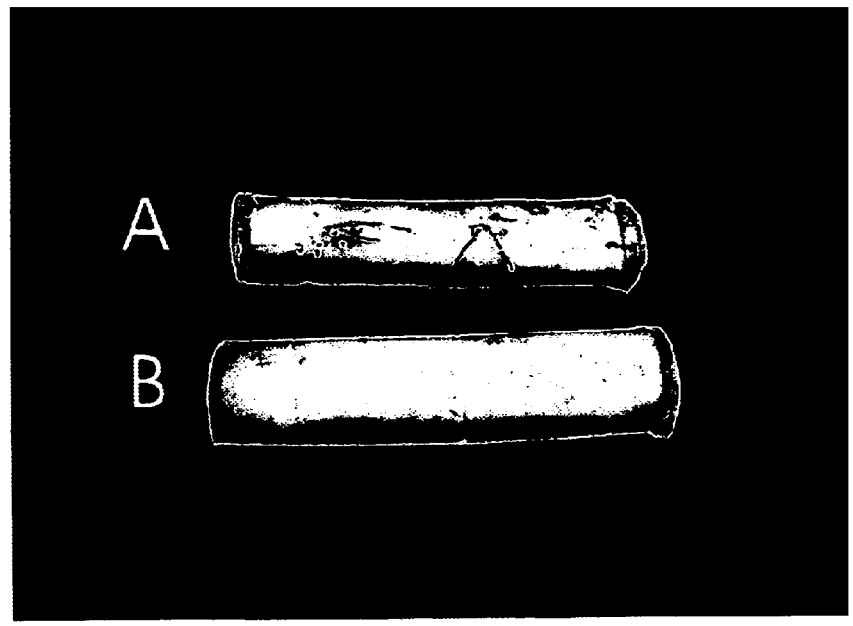
FIG. 4 shows that termites readily tunneled through the closed-cell polyethylene wrapping of the HS bait and consumed cellulose baits within (FIG. 4A) but that the cellulose bait inside HS bait tubes that were not fed on by termites remained dry and intact during the field experiment (FIG. 4B).

Twenty HS baits containing cellulose baits (similar to those shown in FIG. 1A, FIG. 3, and FIG. 4) were placed in soil for 12 months to test their durability. These HS baits were made from approximately 3 mm-thick sheets of closed-cell polyethylene sheets partially rolled to form hollow tubes having a diameter of approximately 3 centimeters and a length of approximately 20 centimeters. Toxicant bait as shown in FIG. 1A and FIG. 3 was placed in each tube. The seam of the polythene sheet and end plugs of the same polyethylene material were hot glued to seal the baits.

The test was conducted in soil under outdoor conditions in south Florida. There was no known termite activity in the soil for this test site. Ten wooden stakes were planted in the soil as a comparison. After 12 months exposure, HS baits were cut open to examine the status of the termite bait materials. In all cases, the cellulose bait material remained dry and intact (FIG. 3), while wooden stakes were badly decayed by fungi and in some cases damaged by wood destroying beetles. Soil dwelling organisms such as earthworms were also found in wet and badly decayed stakes. The results demonstrated that the closed-cell polyethylene wrapping provided protection of cellulose baits against environmental factors such as rainfall, high humidity, temperature fluctuation, and other biotic factors such as fungal decay, other soil dwelling organisms, and other wood destroying insects.

EXAMPLE 2

Field Efficacy Test A

Residents of a single-family home noticed termites swarming from kitchen cabinets in the spring of two consecutive years (1996 and 1997). A close inspection uncovered further infestations of the subterranean termite, *R. virginicus*, in other wooden components of this house. Wooden stakes (1"×1.5"×12") were placed in the soil in the backyard to detect termite activity. When survey stakes were infested by termites, underground monitoring stations similar to that described by Su & Scheffrahn (1986, *Sociobiology* 12:299–304) were installed. By the summer of 1997, termite activity was found in two monitor stations. Termite again swarmed in the kitchen in the spring of 1998. More stations were installed between then and the summer of 1999, but in all cases, termites did not return to the stations once they were opened for inspection. Similar observations were made in the infested wood in the house and in other wooden stakes in the soil; and termites did not return to the locations when they were disturbed. The results agreed with previous experiences with some infestations of *R. virginicus* when SENTRICON® stations were used. In such incidents, *R. virginicus* had a tendency to avoid stations when the stations were open for bait placement, resulting in prolonged bait delivery (and even failure) in some cases.

Eight HS baits in the configuration of FIG. 1C were placed vertically in the soil (FIG. 2A) surrounding the house in September 1999; they were not disturbed until July 2000. The bait matrix itself was similar to that used in SENTRICON® systems and contained 0.5% hexaflumuron. Termite activity was observed in the house and mulch piles next to the house in October and December of 1999, but since January 2000, no termites have been found in any of the survey stakes, monitoring stations, in the house, and in other landscape materials near the house. Termites did not swarm in the spring of 2000. In July 2000, when termite activity had been absent from the site for over seven months, the eight HS baits were removed from soil for inspection. Evidence of termite feeding was observed in two HS baits (FIG. 4A). Over 80% of the cellulose baits in the HS bait were consumed, but no live termites were found in the HS baits. Cellulose bait in the six HS baits that were not fed upon by termites remained dry and intact (FIG. 4B). Because termites consumed the baits sometime between September 1999 and July 2000, and because no termite activity has been observed between January 2000-February 2003, it was concluded that the *R. virginicus* population that had been infesting this house for over four years was eliminated after consuming the HS baits of the subject invention.

EXAMPLE 3

Field Efficacy Test B

Figure 5A:
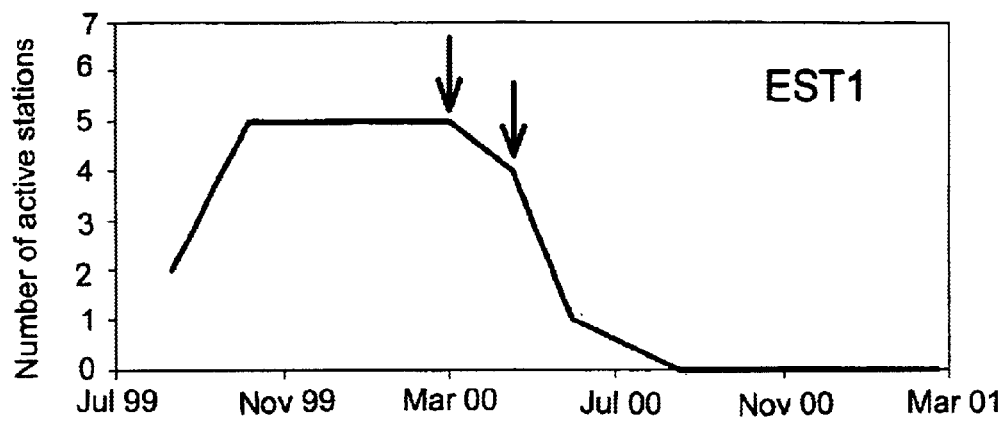
FIG. 5 shows termite activity as measured by the number of active monitoring stations (stations exhibiting evidence of termite feeding activity) before, during, and after application of HS baits at one site with known infestation of the eastern subterranean termites (FIG. 5A; EST1; *Reticulitermes flavipes*) and two sites infested with the Formosan subterranean termites (FIGS. 5B and 5C; FST1, FST2; *Coptotermes formosanus*). Two arrows depict the placement ($1^{st}$ arrow) and removal ($2^{nd}$ arrow) of HS baits.

Subterranean termite infestations and spring swarms were observed in a single family home for three years (1997–1999). Despite repeated soil treatments, termite activity persisted; the pest control firm under treatment contract suspected the presence of the Formosan subterranean termite, *Coptotermes formosanus*. A stake survey conducted in the summer of 1999 revealed high activity of the eastern subterranean termite, *R. flavipes*, but *C. formosanus* was not found in this site. In August 1999 two monitoring stations harbored termite activity; by October the number of active stations increased to five (FIG. 5A, EST1). This *R. flavipes* population maintained this level of activity throughout the winter of 1999 to the spring of 2000 during which another termite swarming was observed. On Mar. 1, 2000, 25 HS baits containing 0.5% hexaflumuron similar to FIG. 1C were installed in soil surrounding this house. By Apr. 17, 2000, termites collected from the five monitoring stations contained an abnormally high proportion of secondary reproductive (an indication of population disruption by hexaflumuron). All of the termites collected on April 17 died shortly when kept under laboratory conditions; another indication that this population had consumed and were affected by hexaflumuron. By May 31, 2000, only 79 termites were collected from one station; the remaining four stations did not show any sign of termite activity (i.e., no termite or termite feeding). Of the 79 termites collected, 46 were secondary reproductive; 33 workers exhibited signs of hexaflumuron effects such as sluggish movements and marble coloration. Since August 2000, no termite activity has been found in any of the monitoring stations (FIG. 5A, EST1). Of the 25 HS baits installed on March 21, two were consumed by termites (FIG. 4A), and 23 were untouched (FIG. 4B). As with Example 1, cellulose bait in the 23 HS baits that were not eaten by termites remained dry and intact. Because termites consumed the baits sometime between March and August of 2000, and because no termite activity has been found since then, it was concluded that the *R. flavipes* population that had been infesting this house since 1997 was eliminated after consuming the hexaflumuron baits.

EXAMPLE 4

Field Efficacy Test C

Figure 5B:
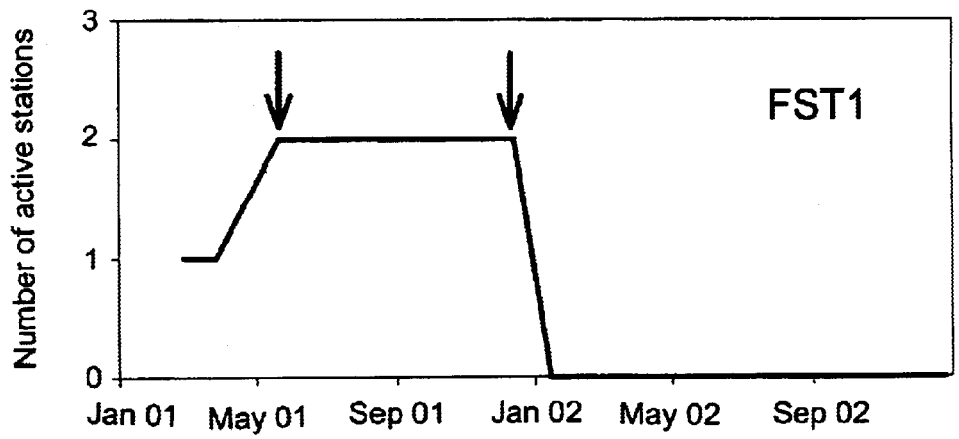

Subterranean termite activity was noted in wooden fences and scrap woods on the backyard ground by the homeowner of a single-family home. Termites collected from the infested wood confirmed the presence of the Formosan subterranean termite, *C. formosanus*. The house is located in the urban southeastern Florida where the Formosan subterranean termite has been reported since 1980. Many houses in this area have been invested and severely damaged by this destructive termite species. Stake survey was conducted in the winter of 2000, and by the spring of 2001, two underground monitoring stations were established. Heavy swarming activity of *C. formosanus* was also recorded in this site in spring of 2001. In May 2001, fourteen HS baits similar to FIG. 1C were placed horizontally near the soil surface (FIG. 2B) and covered with semi-circular pieces of PVC tubing to avoid unintentional breakages of HS baits by the resident. By July 2001, one HS bait was fed upon by *C. formosanus* and replaced with another HS bait in August (FIG. 5B, FST1). The HS bait retrieved in January 2002 was again heavily consumed. Since January 2002, no termite activity has been detected from this site, and all HS baits were removed from the site in June 2002. HS baits that were not consumed by termites remained intact (FIG. 3) even after thirteen months' exposure in the field. It was concluded that after consuming two HS baits between May 2001 and January 2002, this *C. formosanus* population was eliminated.

EXAMPLE 5

Field Efficacy Test C

Figure 5C:
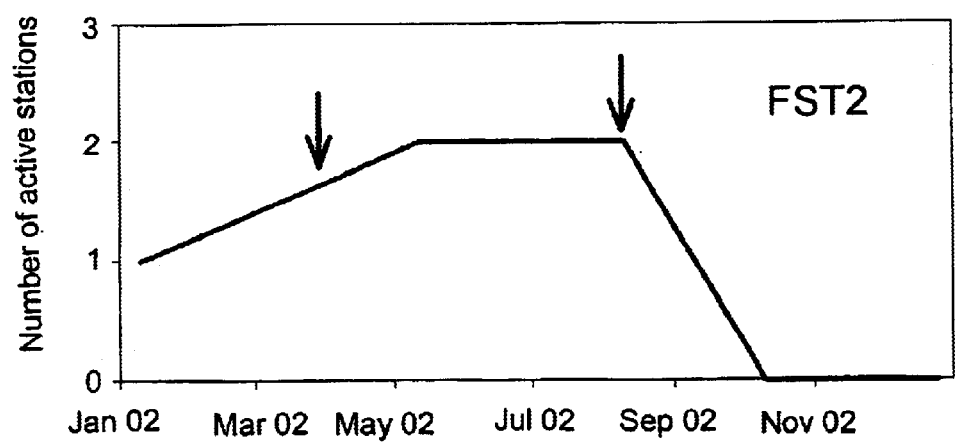

Swarming alates of *C. formosanus* were observed in this house every spring from 2000 to 2002. This house in located in the same area as of Example 4. Severe termite damages were found in the supporting beams of the roof of this single family home. Following the stake survey in late 2001, underground monitoring stations were installed, and one or two stations harbored *C. formosanus* activity throughout most of 2002 (FIG. 5C, FST2). In April 2002, fifteen HS baits similar to FIG. 1C were placed horizontally near soil surface (FIG. 2B) and covered with semicircular pieces of PVC tubing as of Example 4. Following the consumption of one HS bait in June 2002, *C. formosanus* activity declined abruptly, and since October 2002, no termite activity has been found in this property (FIG. 5C, FST2). The invested HS bait that was removed in August 2002 was heavily consumed by *C. formosanus*. Again, HS baits that were not damaged by termites remained intact (FIG. 3) under field conditions for several months. This *C. formosanus* population that had been infesting and causing severe damage to the house since 1999 was eliminated after consuming one HS bait.

What is claimed is:

1. A hermetically sealed bait container comprising a bait matrix within a weather-resistant, termite-edible enclosure that hermetically seals said bait matrix within said enclosure so that when said bait container is exposed to environmental moisture, said bait matrix is not exposed to the environmental moisture, wherein said bait matrix comprises a termite toxicant and a cellulose material, and wherein said enclosure is made of a material that is preferred by termites.

2. The bait container of claim 1 wherein said enclosure is made of a flexible, non-rigid material.

3. The bait container of claim 2 wherein said enclosure is cylindrical, having two ends, and comprises a cylindrical wall and two end caps, wherein said enclosure is hermetically sealed at each end by said caps, and said wall and said end caps are made of a water-resistant, termite-edible material.

4. The bait container of claim 3 wherein said wall is made of a polyethylene sheet having four edges wherein two opposite edges are hermetically sealed to each other to form a cylinder.

5. The bait container of claim 4 wherein said polyethylene sheet is approximately 3 millimeters thick.

6. The bait container of claim 1 wherein said bait container is tubular.

7. The bait container of claim 1 wherein said bait container is adapted to removably fit within a durable, rigid station housing.

8. The bait container of claim 1 wherein said bait container is removably fit within a durable, rigid station housing.

9. The bait container of claim 1 wherein said bait container further comprises one or more monitoring components for signaling termite feeding activity.

10. The bait container of claim 1 wherein grooves are formed in said enclosure for encouraging termite chewing.

11. The bait container of claim 1 wherein said hermetic seal is maintainable, absent termite feeding, for at least one year while exposed to environmental conditions.

12. The bait container of claim 1 wherein said bait container further comprises a rigid station housing within said enclosure.

13. The bait container of claim 1 wherein said bait container is made more attractive to termites by a pheromone.

14. The bait container of claim 13 wherein said enclosure is impregnated with a pheromone.

15. The bait container of claim 13 wherein said pheromone is presented by a polymeric semiochemical reservoir.

16. The bait container of claim 15 wherein said polymeric semiochemical reservoir is a polymeric chip impregnated with said pheromone, and said chip is attached to said enclosure.

17. The bait container of claim 1 wherein said hermetic seal is maintainable, absent termite feeding, for at least 6 months while exposed to environmental conditions.

18. The bait container of claim 1 wherein said hermetic seal is maintainable, absent termite feeding, for approximately 6 months to one year while exposed to environmental conditions.

19. The bait container of claim 1 wherein said hermetic seal is maintainable, absent termite feeding, for approximately one to three years while exposed to environmental conditions.

20. The bait container of claim 1 wherein said hermetic seal is maintainable, absent termite feeding, for at least three years while exposed to environmental conditions.

21. A method of reducing or eliminating a population of termites wherein said method comprises the step of placing at least one hermetically sealed bait container in a location that is accessible by termites, wherein said bait container comprises a bait matrix within a weather-resistant, termite-edible enclosure that hermetically seals said bait matrix; where said bait matrix comprises a termite toxicant and a cellulose material; and wherein said enclosure is made of a material that is preferred by termites.

22. The method of claim 21 wherein said bait container is placed in a hole formed in a ground surface and buried.

23. The method of claim 21 wherein said method further comprises the step of marking the location of said bait container with a stake or cover.

24. The method of claim 21 wherein said bait container is placed within a durable, rigid station housing.

25. The method of claim 21 wherein said termites are of a genus selected from the group consisting of *Reticulitermes, Heterotermes*, and *Odontotermes*.

26. The method of claim 21 wherein a plurality of said bait containers are placed in a grid pattern in an area to be protected from termite feeding damage wherein the location of said bait containers are determinable based on the grid pattern to facilitate locating and removing one or more of said bait containers.

27. The method of claim 26 wherein said area is an agricultural area.

* * * * *